(12) United States Patent
Arrasvuori et al.

(10) Patent No.: US 8,538,678 B2
(45) Date of Patent: Sep. 17, 2013

(54) METHOD AND APPARATUS FOR THEMATICALLY MODIFYING LOCATION AND RELATED INFORMATION

(75) Inventors: Juha Henrik Arrasvuori, Tampere (FI); Hannu Korhonen, Kangasala (FI); Markus Montola, Helsinki (FI); Antti Johannes Eronen, Tampere (FI); Jukka Antero Holm, Tampere (FI)

(73) Assignee: Nokia Corporation, Espoo (FI)

( * ) Notice: Subject to any disclaimer, the term of this patent is extended or adjusted under 35 U.S.C. 154(b) by 922 days.

(21) Appl. No.: 12/570,033

(22) Filed: Sep. 30, 2009

(65) Prior Publication Data

US 2011/0077861 A1 Mar. 31, 2011

(51) Int. Cl.
*G01C 21/00* (2006.01)
(52) U.S. Cl.
USPC .......................................................... 701/408
(58) Field of Classification Search
USPC .............. 701/400, 408–409; 340/988, 995.1, 340/995.14
See application file for complete search history.

(56) References Cited

U.S. PATENT DOCUMENTS

| 7,085,578 | B2 | 8/2006 | Barclay et al. |
| 2005/0134693 | A1 | 6/2005 | Torimoto et al. |
| 2005/0160001 | A1 | 7/2005 | Lapre et al. |
| 2005/0195154 | A1 | 9/2005 | Robbins et al. |
| 2007/0233379 | A1 | 10/2007 | Bowman et al. |
| 2008/0132251 | A1* | 6/2008 | Altman et al. ................. 455/457 |
| 2008/0132252 | A1* | 6/2008 | Altman et al. ................. 455/457 |
| 2012/0005267 | A1 | 1/2012 | Chen et al. |

FOREIGN PATENT DOCUMENTS

| EP | 0 963 675 | 12/1999 |
| JP | 7-12909 | 1/1995 |
| WO | WO 98/52379 | 11/1998 |
| WO | WO 2005/062656 A1 | 7/2005 |

OTHER PUBLICATIONS

Final Rejection for related U.S. Appl. No. 12/561,569 dated Dec. 28, 2012, pp. 1-25.
Office Action for related Chinese Patent Application No. 200780039352.6 dated May 25, 2011, pp. 1-13.
Office Action for related U.S. Appl. No. 12/561,569 dated Sep. 7, 2012, pp. 1-32.

* cited by examiner

*Primary Examiner* — Yonel Beaulieu
(74) *Attorney, Agent, or Firm* — Ditthavong Mori & Steiner, P.C.

(57) ABSTRACT

An approach is provided for thematically modifying location and related information. A location modification platform determines location information of a device associated with a first user. The location modification platform then modifies the location information to indicate a location other than an actual location of the device according to a predetermined theme and causes, at least in part, actions that result in presentation of the modified location information to a second user.

20 Claims, 13 Drawing Sheets

METHOD AND APPARATUS FOR THEMATICALLY MODIFYING LOCATION AND RELATED INFORMATION

BACKGROUND

Service providers (e.g., wireless and cellular services) and device manufacturers are continually challenged to deliver value and convenience to consumers by, for example, providing compelling network services and advancing the underlying technologies. One area of interest has been the development of services and technologies for recording and/or displaying a user's location on a map (e.g., Nokia Friend View) and/or the user's route on a map (e.g., Nokia Sports Tracker). More specifically, these mapping services enable a user to share location and related information (e.g., timing and or event information related to a particular location or route) with other designated users. The use of these services, however, may raise privacy concerns. For example, in some cases, a user may not want to show exactly where the user has been, but turning off location sharing may cause suspicion in other users, particularly when the user has previously been sharing location and routes.

SOME EXAMPLE EMBODIMENTS

Therefore, there is a need for an approach for automatically and consistently modifying shared location and related information to protect privacy by obscuring a user's actual location.

According to one embodiment, a method comprises determining location information of a device associated with a first user. The method also comprises modifying the location information to indicate a location other than an actual location of the device according to a predetermined theme. The method further comprises causing, at least in part, actions that result in presentation of the modified location information to a second user.

According to another embodiment, an apparatus comprising at least one processor, and at least one memory including computer program code, the at least one memory and the computer program code configured to, with the at least one processor, cause, at least in part, the apparatus to determine location information of a device associated with a first user. The apparatus is also caused, at least in part, to modify the location information to indicate a location other than an actual location of the device according to a predetermined theme. The apparatus further causes, at least in part, actions that result in presentation of the modified location information to a second user.

According to another embodiment, a computer-readable storage medium carrying one or more sequences of one or more instructions which, when executed by one or more processors, cause, at least in part, an apparatus to determine location information of a device associated with a first user. The apparatus is also caused, at least in part, to modify the location information to indicate a location other than an actual location of the device according to a predetermined theme. The apparatus further causes, at least in part, actions that result in presentation of the modified location information to a second user.

According to another embodiment, an apparatus comprises means for determining location information of a device associated with a first user. The method also comprises modifying the location information to indicate a location other than an actual location of the device according to a predetermined theme. The method further comprises causing, at least in part, actions that result in presentation of the modified location information to a second user.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for thematically modifying location and related information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term location and related information refers to, at least, information specifying the location (e.g., geographical coordinates, compass heading, speed, etc.) of a device associated with the user, temporal information indicating the time spent en route or at specified locations, information related to events corresponding to the location information (e.g., information identifying people, locations, actions, tools, means of transport, weather, event outcomes, etc. related to the event), or a combination thereof.

Figure 1:
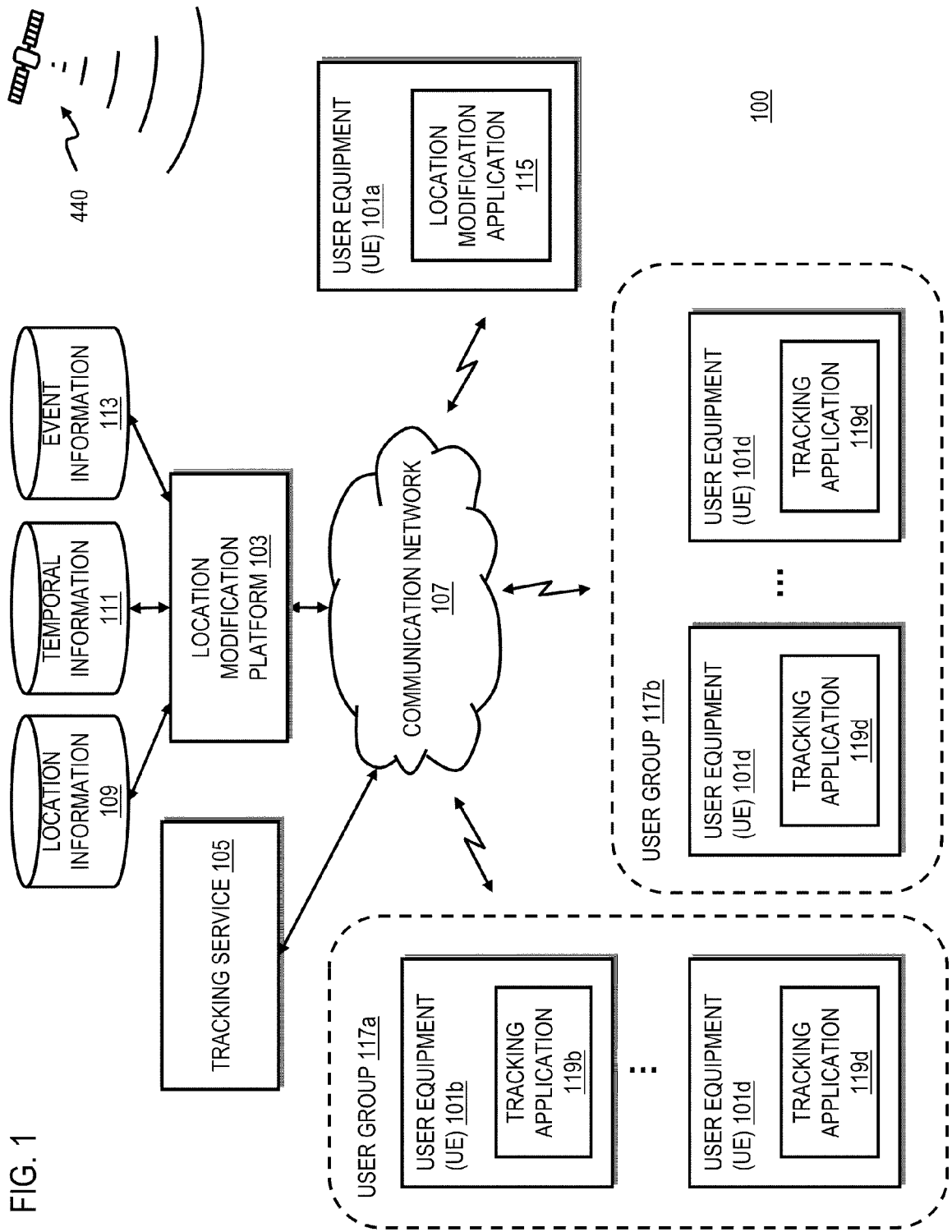
FIG. 1 is a diagram of a system capable of thematically modifying location and related information, according to one embodiment.

FIG. 1 is a diagram of a system capable of thematically modifying location and related information, according to one embodiment. As discussed previously, it is recognized that services that track and display a user's location and/or route are becoming increasingly popular. Moreover, these services are growing in sophistication and can provide additional capabilities such as "lifelogging" whereby information related to events occurring in a user's life are captured (e.g., continuously or discretely) along with the location information concerning where and when the events occurred. As used herein, "lifelogging" includes recording descriptive elements about a user's life events including, e.g., information identifying people, locations, actions, tools, means of transport, weather, event outcomes, etc. related to the events. This descriptive information, for instance, may be recorded automatically from sensors contained in the user's device or recorded manually by the user in the user device (e.g., blog entries, social network status updates, etc.).

However, there may be times when the user wants privacy and, therefore, would like to stop sharing such information. Conventional approaches enable the user to simply turn off the tracking service. However, a user who does not want to share location or lifelogging information may raise suspicion among other users, particularly when the user routinely shares such information. That is, other users may wonder why a particular user has turned off the tracking off and why the user may not want to share such information, heightening interest when the user may want to decrease increase in the user's activities.

To address this problem, the system 100 of FIG. 1 introduces the capability to automatically and consistently apply predetermined themes for modifying or offsetting the location and related information displayed to other users. More specifically, the system 100 enables a user to define a theme that can be used to automatically modify the user's location and related information. The modified information, for instance, indicates locations and/or events that are different from the actual locations and/or events recorded by the tracking service. In this way, the user can advantageously protect the user's privacy without raising suspicion from other users who are receiving the information.

For example, the user may define a predetermined theme that includes substituting any points of interest (POIs) visited by the user that are of the type "pub" with POIs of the type "museum." When this theme is applied, the system 100 automatically chooses a POI of the type "museum" to display in place of the POI type "pub" when the user visits a pub. Accordingly, the other users that are viewing the user's location through a tracking service will see that the user has visited a museum instead of a pub. In certain embodiments, the system 100 enables the user to define separate thematic modifications or offsets that are applied to different groups of users. By way of example, the user may apply one predetermined theme (e.g., substitute pubs with museums) for users who are in a "classmates" group and another predetermined theme (e.g., substitute pubs with grocery stores) for users who are in a "family" group.

As an extension the predetermined theme may also be applied to temporal information associated with the location information. The temporal information, for instance, describes how much time the user spends traveling on a particular route or remaining at a particular POI. For example, the thematic offset may scale the time a user spends at a gym to twice the actual length of time. In this way, it will appear to other users that the user has spent twice the amount of time at the gym than actually spent by the user.

If the tracking service includes a lifelogging function, the system 100 also enables the user to apply thematic offsets to elements of event information. As described earlier, elements of event information essentially define what the user does, where, with whom, how, and when by capturing information that identifies people, locations, actions, tools, means of transport, etc. associated with an event. For example, when applied to event information, the predetermined theme may modify or offset the person identified with the event. The user may, for instance, define the predetermined theme so that the tracking service will display that the user is accompanied by a movie star rather than by the user's grandmother to a particular event or location. It is contemplated that the theme may be defined to modify or offset any of the event information elements. In certain embodiments, event information may also include situational information without a specific correlation to a particular location. In this case, the system 100 may modify or offset the event or situation (e.g., the who, how, when, etc. without the where).

For example, the event or situation may specify simply that a user is having lunch with his or her grandmother without specific where they are having lunch. In this case, the actual situation (e.g., having lunch with grandmother) may be offset to an offset situation (e.g., having lunch with a movie star).

Following modification of the location and related information, the system 100 may also create, generate, display, or otherwise represent the modified information using any mechanism including computer animation (e.g., two-dimensional and three-dimensional animation, map displays, pictures, video files, audio files, etc.

As shown in FIG. 1, the system 100 comprises user equipment (UEs) 101a-101n having connectivity to a location modification platform 103 and a tracking service 105 via a communication network 107. In one embodiment, the location modification platform 103 facilitates the modification of location and related information according to one or more predetermined themes. By way of example, the location modification platform 103 has connectivity to a database 109 of location information, a database 111 of temporal information, and a database 113 of event information to perform location modification functions. The information stored in the databases 109-113 is determined from the UE 101a that is executing a location modification application 115.

In one embodiment, the location modification application 115 may operate as a client of the location modification platform 103 to thematically modify determined location and related information. More specifically, the location modification application 115 can interact with location sensors in the UE 101a using any location technology (e.g., global positioning system (GPS) satellites, cellular triangulation, near-field communication (NFC) hotspots, location beacons, etc.) to generate and transmit location information (e.g., geographical coordinates, compass heading, speed, etc.) for storage in the location information database 109. In addition, the location modification application 115 and/or the location modification platform 103 may determine temporal information from the location for storage in the temporal information database 111. In one embodiment, if the location information is collected continuously or at predetermined intervals, the temporal information can be determined by calculation and analysis of the location information. The temporal information can also be determined by analysis of the timing information (e.g., time of location determination) is included in the location information. In addition or alternatively, the location modification platform 103 and/or the location modification application 115 may determine the temporal information by manual input from the user of the UE 101*a*. With respect to the event information (e.g., lifelogging information), the UE 101*a* may include a variety of sensors (e.g., for detecting location, heading, temperature, moisture, devices, people, surroundings, etc.) to detect elements that describe an event associated with the location information. As described previously, in certain embodiments, the event information need not be linked with a specific location, and the location modification platform 103 may modify the event information independently of the location information. This event information is then stored in the event information database 113. In addition or alternatively, the location modification platform 103 and/or the location modification application 115 may determine the event information from manual input from the user of the UE 101*a* or by analyzing communications (e.g., e-mail, text messages, voice messages, search histories, Internet browsing histories, etc.), descriptions provided by the user (e.g., social networking status, blogs, etc.), direct input from the user, and the like.

By way of example, the UE 101*a* is configured to share its location and related information with the UEs 101*b*-101*n* using the tracking service 105 and/or the tracking applications 119*b*-119*n* executed respectively by the UEs 101*b*-101*n*. In other words, the UEs 101*b*-101*n* are authorized to receive and/or view the location and related information generated at the UE 101*a* that has been modified according to a predetermined theme. In one embodiment, the predetermined theme is defined individually for different groups of UEs 101. For example, FIG. 1 illustrates the UEs 101*b*-101*d* organized into a first user group 117*a* and the UEs 101*d*-101*n* organized in to a second user group 117*b*. Each user group 117*a* and 117*b* can be associated with a different predetermined theme. Accordingly, the location modification platform 103 and/or the location modification application 115 can modify or offset the location and related information of the UE 101*a* differently for each of the two user groups 117*a* and 117*b*. In this way, the UEs 101*b*-101*d* of the user group 117*a* receives modified location and related information associated with the UE 101*a* that is different from the modified location and related information received by the UEs 101*e*-101*n* of the user group 117*b*. This differential modification enables the user of the UE 101*a* to customization the modifications to be presented to each user group 117.

In one embodiment, the tracking service 105 is a managed service provided by a service provider or operator of the network 107 (e.g., Nokia FriendView, Nokia Sports Tracker). By way of example, the tracking service 105 collects, assembles, stores, updates, and supplies location and related information associated with a user (e.g., the user of the UE 101*a*) and shares this information with designated users (e.g., UEs 101*b*-101*n*) or groups of users (e.g., user groups 117*a* and 117*b*). When operating under the approach described herein, the tracking service 105 receives and presents location and related information modified according to one or more predetermined themes by the location modification platform 103 and/or the location modification application 115. The tracking service 105 then renders the location and related information for presentation to the UEs 101*b*-101*n*. In one embodiment, the tracking service 105 can render the modified information according to the presentation capabilities of the receiving UEs 101*b*-101*n* including using computer animation, annotated maps, related media files, and the like.

As shown, the tracking service 105 may operate in conjunction with the tracking applications 119*b*-119*n* executed respectively by the UEs 101*b*-101*n*. Like the location modification application 115, the tracking applications 119*b*-119*n* may operate as a client of the tracking service 105 to receive and render the modified location and related information from the location modification platform 103 and/or the location modification application 115. In addition or alternatively, the tracking applications 119*b*-119*n* may operate independently of the tracking service 105 to receive and render the modified location and related information.

Figure 11:
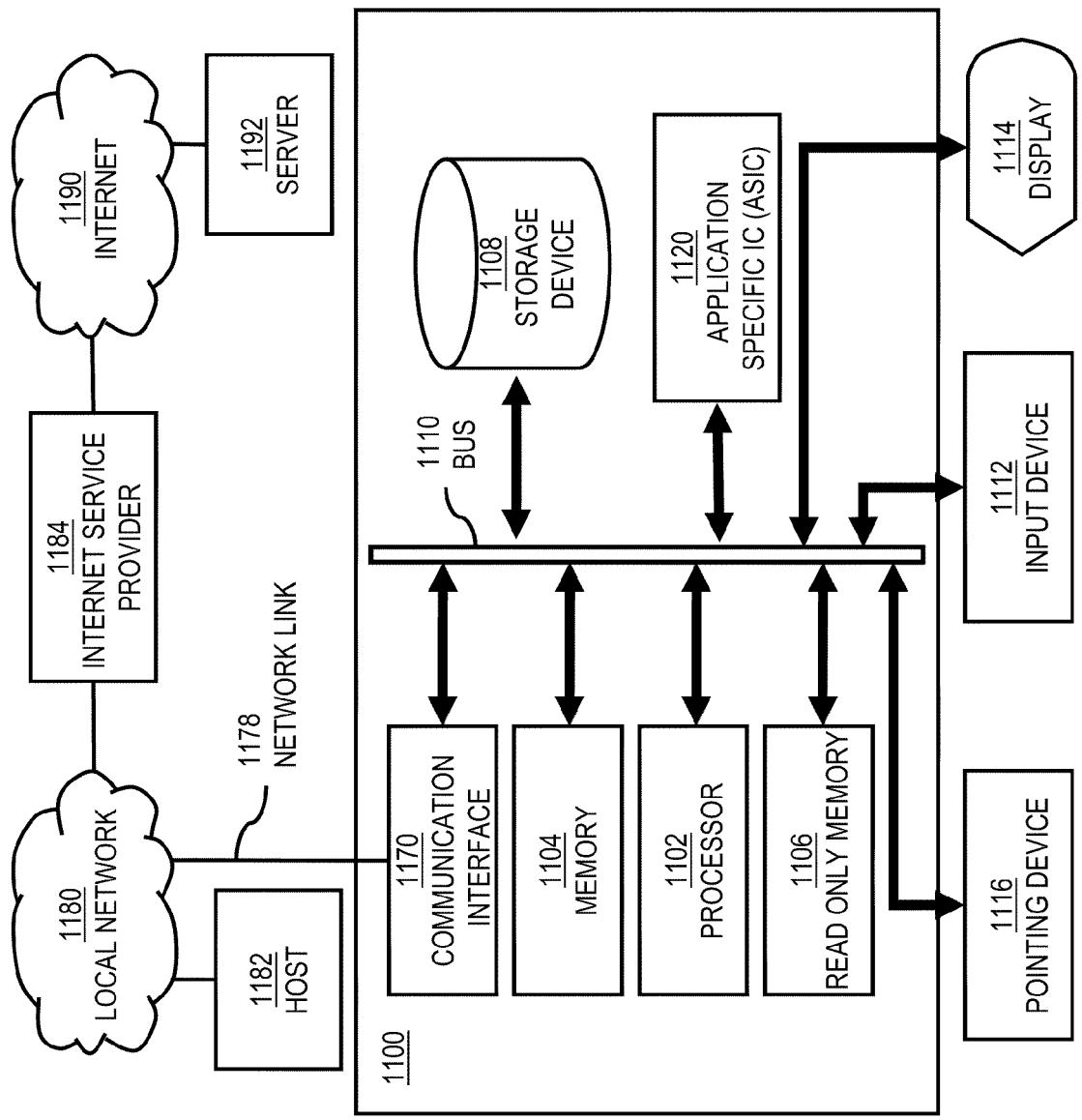
FIG. 11 is a diagram of hardware that can be used to implement an embodiment of the invention.

In one embodiment, the location modification platform 103 and the tracking service 105 can be implemented via shared, partially shared, or different computer hardware (e.g., the hardware described with respect to FIG. 11).

By way of example, the communication network 107 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 may also be equipped with one or more location sensors (e.g. a global positioning satellite (GPS) sensor) for use with the location modification platform 103, tracking service 105, location modification application 115, and/or tracking application 119.

By way of example, the UEs 101*a*-101*n*, the location modification platform 103, and the tracking service 105 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
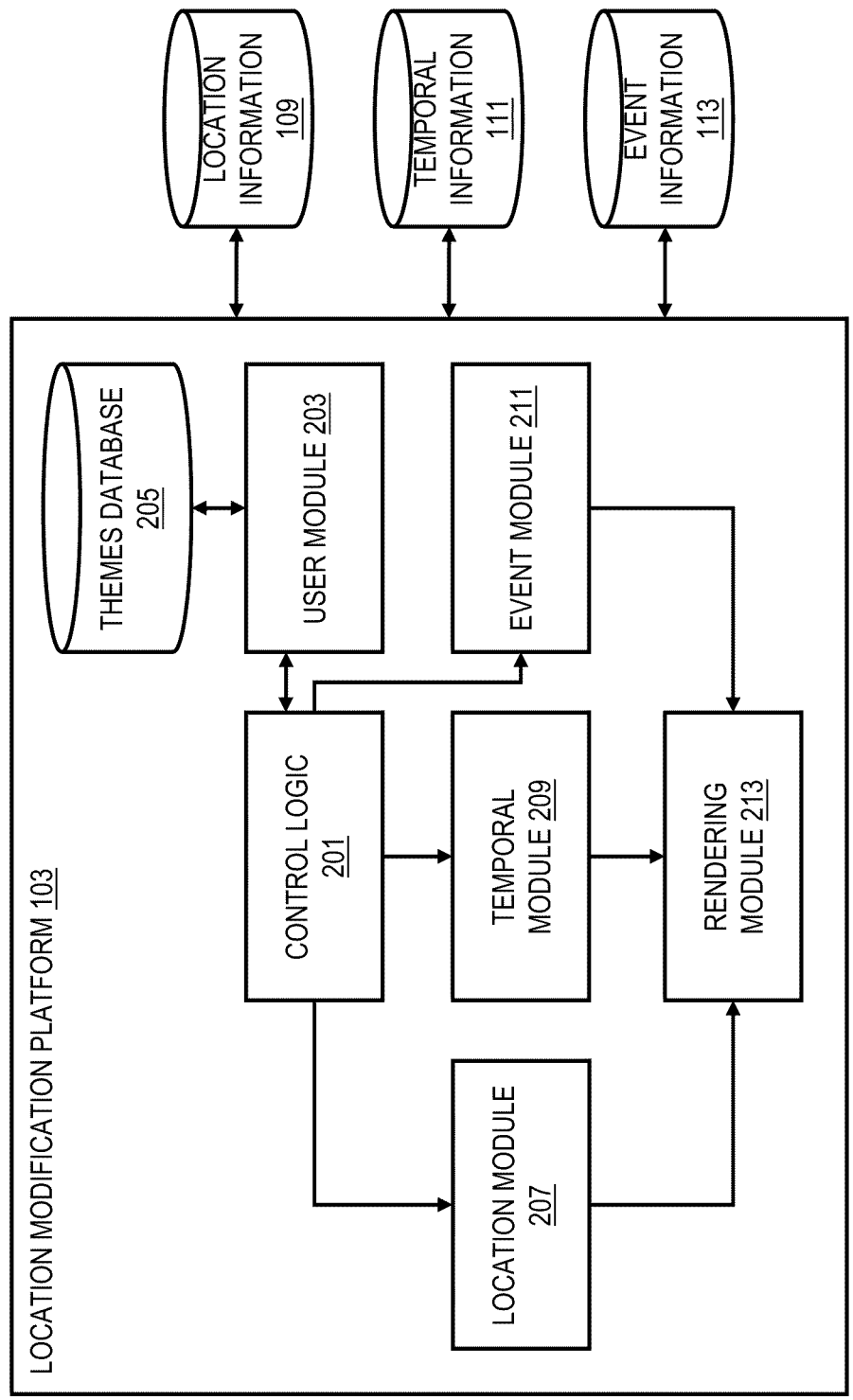
FIG. 2 is a diagram of the components of a location modification platform, according to one embodiment.

FIG. 2 is a diagram of the components of a location modification platform, according to one embodiment. By way of example, the location modification platform 103 includes one or more components for thematically modifying location and related information. It is contemplated that the functions of these components may be combined in one or more components or performed by other components of equivalent functionality. In this embodiment, the location modification platform 103 includes at least a control logic 201 which executes at least one algorithm for executing functions of the location modification platform 103. For example, the control logic 201 interacts with the user module 203 to define themes for modifying location and related information. These themes, for instance, direct how the location modification platform 103 will modify the actual location and related information received from a UE 101 that is sharing such information. More specifically, the themes may include rules for substituting one or more selected elements of location information (e.g., geographical coordinates, POIs, heading, etc.), temporal information (e.g., time spent en route or at a particular location), and event information (e.g., associated people, locations, actions, tools, means of transport, weather, event outcomes, etc.) for another element.

In one embodiment, the predetermined theme may be based on a thematic template specified, for instance, by the service provider, operator of the communication network 107, third party provider, and the like. These thematic templates provide for a coordinated substitution of the elements of the location and related information based on a unified (e.g., artistic) concept. For example, the theme may be based on a movie plot line (e.g., action movie, romance movie). In this case, location and related information will be substituted with information related to the movie plot line. For example, if the movie plot line on which the theme is based involves visiting a casino in a high performance sports car, the theme will substitute elements from this plot to modify the actual location and related information. Therefore, instead of a user traveling by bus to a shopping mall, the theme will offset this information to show that the user traveled by a sports car to a casino. It is contemplated that themes may be created using any unified thematic template including for instance lifestyle themes (e.g., high fashion culture, student life, celebrity lifestyle, etc.), hobby themes (e.g., car racing, sports, computers, etc.), and the like. The location modification platform 103 and/or the location modification application 115 can then modify the location and related information of, for instance, the UE 101a to incorporate elements from the theme automatically and consistently. As discussed previously, in one embodiment, the themes may be defined on a user group-by-user group basis so that different themes may be applied for different user groups 117. The user module 203 stores the themes and associated user groups 117 defined by the user in, for instance, the themes database 205 for later retrieval.

The control logic 201 then interacts with the location module 207 to modify the location information determined from the UE 101a according to one of the predetermined themes stored in the themes database 205. For example, the location module retrieves the location information from the location information database 109 or directly from the UE 101a to apply the predetermined theme. After modifying the location and related information, the location module 207 may store both the actual and modified location information back to the location information database 109. Similarly, the temporal module 209 may determine temporal information associated with the location information by deriving the location information from the location information or by input from the user. For example, the user may select particular locations or routes and input a corresponding time associated with each location or route. The temporal module 209 can then scale the temporal information according to the predetermined theme. By way of example, the temporal module 209 may determine the type of a location associated with a particular time value and scale that time based on the theme. For example, the theme may indicate that time spent at a museum should be scaled by a factor of two. If the determined time value is associated with a POI corresponding to a museum, the temporal module 209 scales the temporal information (e.g., time value) by a factor of two as prescribed by the predetermined time. The original and scaled temporal can be stored in the temporal information database 111 for later retrieval.

The control logic 201 also interacts with the event module 211 to receive event information (e.g., lifelogging information) corresponding to the location information determined for the UE 101a. In certain embodiments, the event module 211 may receive event or situational information independently from the location information. By way of example, the event information is provided via sensors of the UE 101a or by manual input from the user associated with the UE 101a. As discussed previously, the event information provides additional descriptive to supplement the location information by defining what the user has done, where, with whom, how, and when in relation to the location information. When decoupled from the location information, event information represents a situation associated with the user. The event information can be broken down in individual information elements (e.g., people, locations, actions, tools, means of transport, weather, event outcomes, etc.) that can be individually or collectively modified according to the predetermined theme. As with the location module 207 and the temporal module 209, the event module 211 can store both the original and modified event information in the event information database 113 for later retrieval.

After completing the modification of the location and related information, the control logic 201 may direct the rendering module 213 to cause the presentation of the modified information to the UEs 101b-101n within the user groups 117a and 117b. In one embodiment, the rendering module 213 interacts with the tracking service 105 and/or the tracking application 119 to render the modified information. In addition or alternatively, the rendering module 213 may directly render the modified information and transmit the rendering to the UEs 101b-101n for display. In certain embodiments, the rendering module 213 can provide a rich presentation of the modified information that incorporates computer animation (e.g., two-dimensional and three-dimensional animation) representing elements of the information. In addition, the rendering module 213 may transmit or cause the transmission of media files associated with the predetermined theme or modified information to the UE 101a. For example, if the modified information indicates that a user has visited a museum, the rendering module 213 can transmit or otherwise convey a picture or other media related to the museum for storage in the user's UE 101a. In this way, the media file enables the user to have an indication that the user has visited the location specified in the modified location information even though in actuality, the user has made no such visit.

According to another embodiment, the functions of the location modification platform 103 as well as the functions of the tracking service 105, the location modification application 115, and/or the tracking application 119 can be implemented via an access control application (e.g., a widget) (not shown) in the UE 101. Widgets are light-weight applications, and provide a convenient means for presenting information and accessing services. It is contemplated that the functions of these components may be combined in one or more components or performed by other components of equivalent functionality.

In this embodiment, the location modification application 115 includes modules similar to those of the location modification platform 103, as described above. To avoid data transmission costs as well as save time and battery, the control logic of the location modification application 115 can fetch map data cached or stored in its own database, without requesting data from any servers or external platforms, such as the location modification platform 103 or the tracking service 105. Usually, if the UE 101 is online, data queries are made to online search server backends, and once the device is off-line, searches are made to off-line indexes locally.

Figure 3:
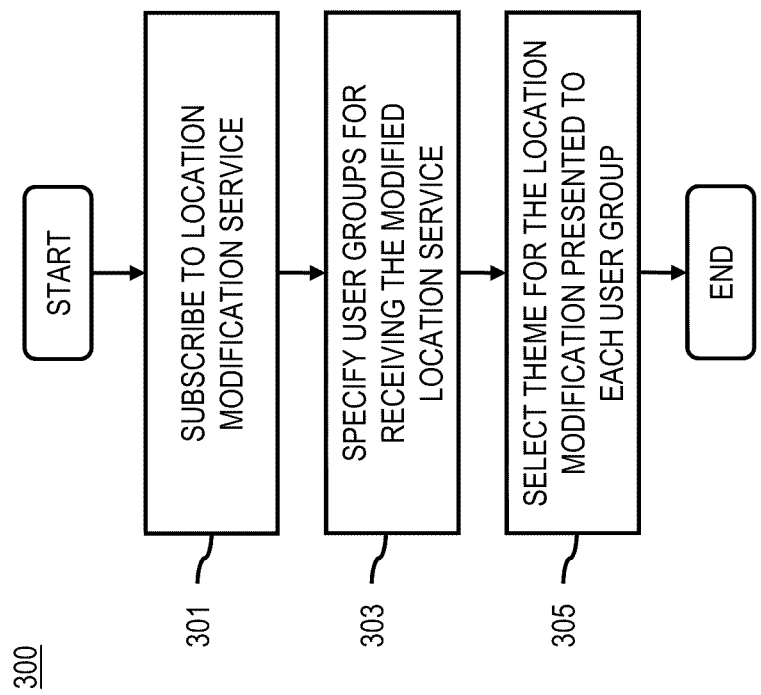
FIG. 3 is a flowchart of a process for subscribing to a location modification service, according to one embodiment.

FIG. 3 is a flowchart of a process for subscribing to a location modification service, according to one embodiment. In one embodiment, a user of the UE 101a performs the process 300 using, for instance, the location modification application 115. In step 301, the user subscribes to the location modification service provided by the location modification platform 103. The process of subscribing includes, for instance, establishing billing and account information to provide access to the location modification service. The process may also include providing or exchanging authentication information between the UE 101a and the location modification platform 103 to ensure that the UE 101a is authorized to access the services of the location modification platform 103. It is contemplated that any authentication mechanism (e.g., user name/password, network address filtering, biometric security, etc.) may be used to ensure that only authorized users may access the location modification service.

After establishing a subscription to the service, the user specifies one or more user groups 117 to receive the modified location information provided by the service (step 303). Each user group 117 may contain any number of UEs 101 designated by the user. Alternatively, the user can configure the location modification service to provide modified location information to all users without limitation to designated users. For example, the user may create a user group 117 including UEs 101 associated with family members and another user group 117 including UEs associated with coworkers. It is contemplated that the user may create any number of user groups. Once the user groups are defined, the user may select a predetermined theme for modifying the user's location and related information individually for each user group (step 305). Selecting a theme for individual groups enables the user to customize how location and related information is modified for each group. For instance, the user may designate at predetermined theme that makes no modification to the location and related information for a user group 117 of close friends, whereas the user can designate a predetermined theme to obscure actual location and related information for a user group 117 of coworkers.

Figure 4:
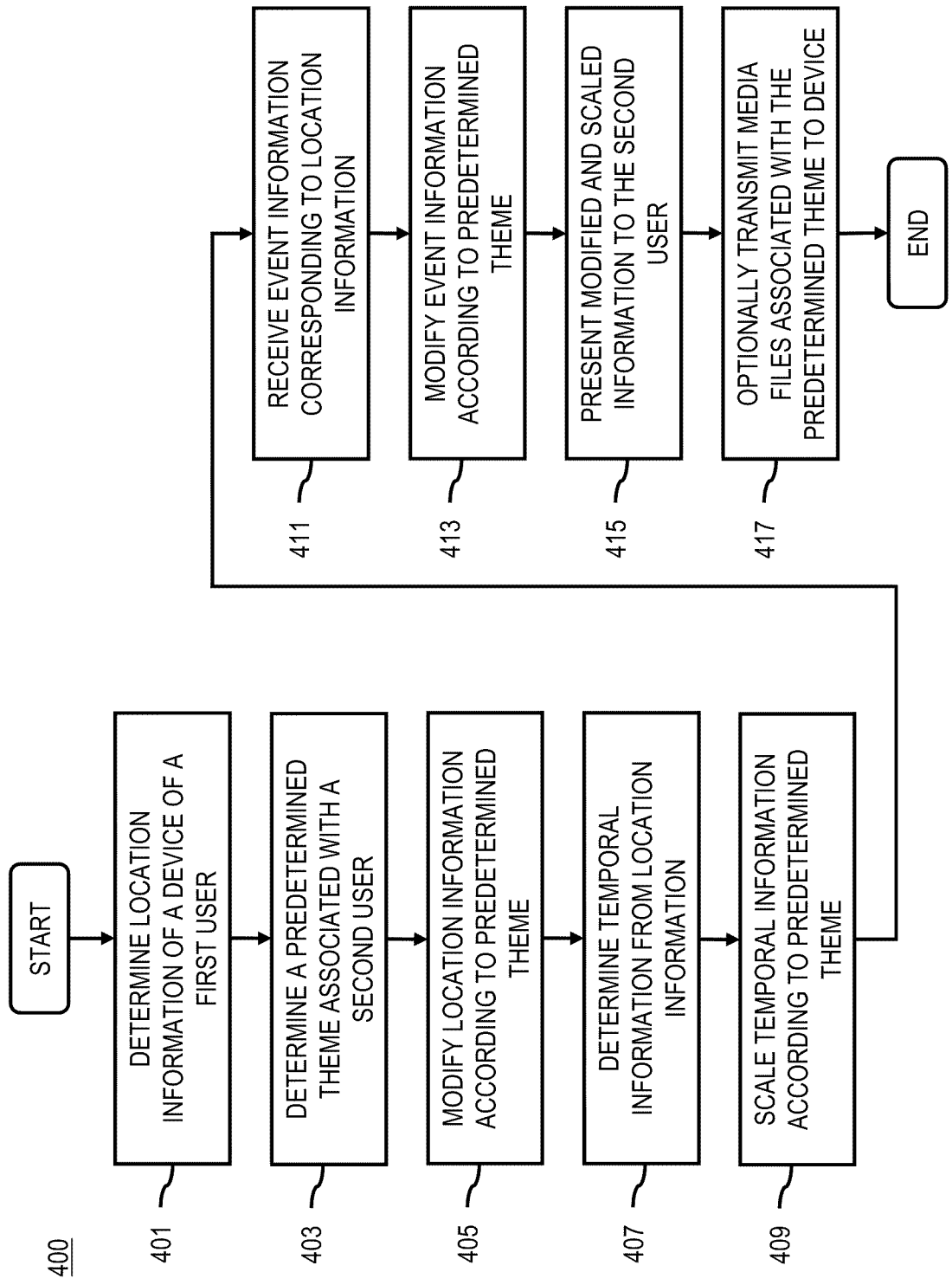
FIG. 4 is a flowchart of a process for thematically modifying location and related information, according to one embodiment.

FIG. 4 is a flowchart of a process for thematically modifying location and related information, according to one embodiment. In one embodiment, the location modification platform 103 performs the process 400 and is implemented in, for instance, a chip set including a processor and a memory as shown FIG. 12. In step 401, the location modification platform 103 determines location information of a UE 101a corresponding to a user who is sharing location information via the location modification service. In one embodiment, the location information is determined through sensors of the UE 101a employing technology such as GPS, cellular triangulation, NFC hotspots, and the like. Moreover, the location may be determined based exact geographical coordinates taken continuously or at predetermined intervals. In this case, the route and positioning information can be provided with greater granularity. For example, the location information determined in this manner can show more precisely the route or tracks of the UE 101a. In addition or alternatively, the location information may be determined in relation to POIs. In other words, the location information is only recorded when the user enters a known POI. This method of determination location reduces the amount of location information that is processed by the location modification platform 103, but also reduces the granularity with which the UE 101a's location can be tracked. For example, determining routing information in relation to POIs will show, for instance, the location of the each visited POI with straight lines connecting the POIs rather than the actual route.

Next, the location modification platform 103 determines a predetermined theme that is to be applied for each user group 117 that is authorized to receive the location information from the UE 101a (step 403). By way of example, the location modification platform 103 identifies each user group 117 and consults the themes database 205 to identify the predetermined theme that has been preselected for the user group 117. If no predetermined theme has been selected for a particular user group 117, the location modification platform 103 may apply a default theme or may request that the user associated with the UE 101a select a theme. For example, the user defines via the UE 101a the predetermined theme to modify the actual location information (e.g., an actual POI visited) and generate modified location information (e.g., substituted POI) that is to be displayed to UEs 101 receiving the modified location information via, for instance, the tracking service 105.

For example, the location modification platform 103 offers a number of POIs from among which the user can define substitution relationships for incorporation into the predetermined theme. For example, the user may define POI substitutions as illustrated in Table 1 below.

TABLE 1

| Actual POI | Substitute POI |
| --- | --- |
| Pub | Museum |
| Karaoke Bar | Library |
| Flea Market | Gym |

In one embodiment, the POIs may be selected by the user on the UE 101a using pull-down menus or another similar user interface. By way of example, the user interface may be provided by the location modification application 115 on the UE 101a itself or via, for instance, a web-interface or other client to the location modification platform 103. If the destination of the UE 101a is known, the location modification platform 103 can present only those POI types that are in the area of the destination. As discussed previously, the user may also define that different user groups 117 see different substitute POIs. Table 2 below illustrates such an example.

TABLE 2

| Actual POI | Substitute POI for user group "Family" | Substitute POI for user group "Friends" |
| --- | --- | --- |
| Museum | -not shown- | Pub |
| Karaoke Bar | Library | -not shown- |
| Flea Market | Gym | Pub |
| Zoo | -not shown- | -not shown- |

In another embodiment, instead of specific POI types, the location modification platform 103 may also offer the user more generic collections or profiles of POIs such as sports, tourism, highbrow culture, lowbrow culture, and shopping to incorporate into the predetermined theme. For example, the sports profile may include POIs such as gyms, swimming pools, sports fields, ice skating rinks, etc. In another example, the user can define a theme that substitutes POIs of the type "lowbrow culture" (e.g., comedy clubs, pool hall, tractor pulls, etc.) with POIs of the type "highbrow culture" (e.g., art galleries, concert halls, ballet, etc.). Under this scenario, the location modification platform 103 can then choose which POIs from with the broader category that would fit the theme. The user may further define within the theme that a specific type of POI not be shown (e.g., indicated by "-not shown-" in Table 2 above).

After determining the appropriate predetermined theme to apply, the location modification platform 103 modifies the location information according to the predetermined theme (step 405). For example, the location modification platform 103 chooses a POI of the substitute type that is closest to the actual POI visited to replace the actual POI. Alternatively, the location modification platform 103 may select substitute POIs that form a seemingly cohesive route or that is otherwise feasible given the locations of the actual and substitute POIs, layouts, road ways, etc. of the map area. Selecting substitute POIs within the same vicinity of the actual POIs enables the location modification platform 103 to more closely approximate and offset the actual route. That is the modified location information is more likely to have a general route that is similar to the actual route. In addition, the modified location information will still be able to indicate the general vicinity of the UE 101a event the actual locations of the UE 101a is not displayed. In another embodiment, the substitute POIs need not be in the same general vicinity. Instead, the location modification platform 103 may select substitute POIs that, for instance, appear in the same routing layout but transposed to another location with the same city.

In another case, there may be fewer substitute POIs (e.g., museums) than actual POIs visited (e.g., pubs). In this case, the location modification platform 103 may display modified location information that either (1) moves backwards from through the substituted POIs for the remaining actual POIs, (2) restart the substitution from the first substituted POI for the remaining actual POIs, (3) do not show the remaining actual POIs for which there are no substitute POIs, and/or (4) scale the temporal information associated with the POIs as described below. The location modification platform 103 may also alert the user that no substitute POIs are available.

In another sample use case, the location modification platform 103 may substitute POIs based on advertising, marketing, or promotional considerations. For example, a restaurant owner pays the service provider or operator to have the owner's restaurant as the primarily chosen substitute POI in case there are several restaurant POIs that can be used as substitutes in the user's theme.

Next, the location modification platform 103 determines temporal information from the location information described above (step 407). For example, the tracking service 105 and/or the tracking application 119 (e.g., Nokia Sports Tracker) may show routing and location information in relation to time. This temporal information may be calculated from the location information or input by the user. The location modification platform 103 can then scale the temporal information according to the predetermined theme (step 409). For example, scaling may modify the temporal information to show that a particular route took 60 minutes rather than the 30 minutes the route actually took. It is contemplated that the predetermined theme may scale the temporal information to indicate either more or less time spent on a particular route or location.

In step 411, the location modification platform receives event information (e.g., lifelogging information) corresponding to or independent of the location information. For example, the location modification platform 103 may receive event information from various sensors of the UE 101 or by manual input from the user. The sensors, for instance, may be integrated into the UE 101a itself or may be external to the UE 101a and capable of transmitting the sensor information to the UE 101a. In addition, the event information may be stored locally by the location modification application 115 within the UE 101a or on the communication network 107 in the event information database 113 by the location modification platform 103. In addition or alternatively, the user may manually describe one or more elements of the event information using the location modification application 115. For example, the user may describe that the user is currently playing tennis at a particular location. Furthermore, after the game, the user may input that the user won the game. This information represents an example of the event information discussed herein In one embodiment, the occurrence of each recorded event and associated elements are time-stamped in an events list corresponding to the location information. The events and elements can be described with keywords. Examples of elements in the event list (e.g., a lifelog) includes: (1) time of day, season, weather; (2) people associated with the event; (3) animals associated with the event; (4) means of transportation; (5) props or tools that were used and who used them; (6) POIs or locations visited, e.g., country, city, suburb, airport, golf course, restaurant, etc.; (7) actions or activities, e.g., walking, playing darts, mountain climbing, eating, golfing, scuba diving, etc.; (8) outcome of the event or activity, e.g., who won, who lost; (9) media created by the user during the event, e.g., pictures, videos, etc.; (9) media consumed by the user; and the like. An example "raw data" format for recording event information is provided in Table 3.

TABLE 3

Time: Feb 23 - 2009 13:02:00
[People] : [Grandmother]
[Means of Transportation] : [Bus]
[Location] : [Latitude, Longitude]
Time: Feb 23 - 2009 13:19:00
[People] : [Grandmother]
[Activity] : [Eating]
[Location] : [Main Street]
[POI] : [Fast Food Restaurant]

As illustrated in Table 3, the raw data format is used to describe two events related to [Grandmother]. In the first entry, various event elements record a bus ride with Grandmother. In the second entry, various event elements record eating with Grandmother at a Fast Food Restaurant on Main Street. This raw format can be used to, for instance, describe any element of event information. In addition, the event list may be updated in "chunks" (i.e., containing all recorded data), for instance, every 30 seconds. Alternatively, the event list may be updated immediately after new data is recorded by the UE 101a sensors.

After receiving the event information, the location modification platform 103 may apply the predetermined theme to thematically modify the event information by, for instance, performing replacement or substitution of actual elements with substitute elements specified in the predetermined theme (step 413). The location modification platform 103 can then either present or cause the tracking service 105 to present the modified location, temporal, and/or event information to other users (e.g., UEs 101b-101n) (step 415). If the predetermined theme includes a thematic template, the audiovisual presentation of the modified information may have a unified and consistent theme. As an optional extension, the location modification platform 103 can provide or transmit to the UE 101a media content (e.g., pictures, videos, etc.) related to the modified information (e.g., substitute POI) (step 417). For example, if the substitute POI is a museum, the location modification platform 103 can check the media capabilities of the UE 101a (e.g., video camera specifications) and download photographs of the museum taken from a device of similar media capabilities to the UE 101a.

Figure 5:
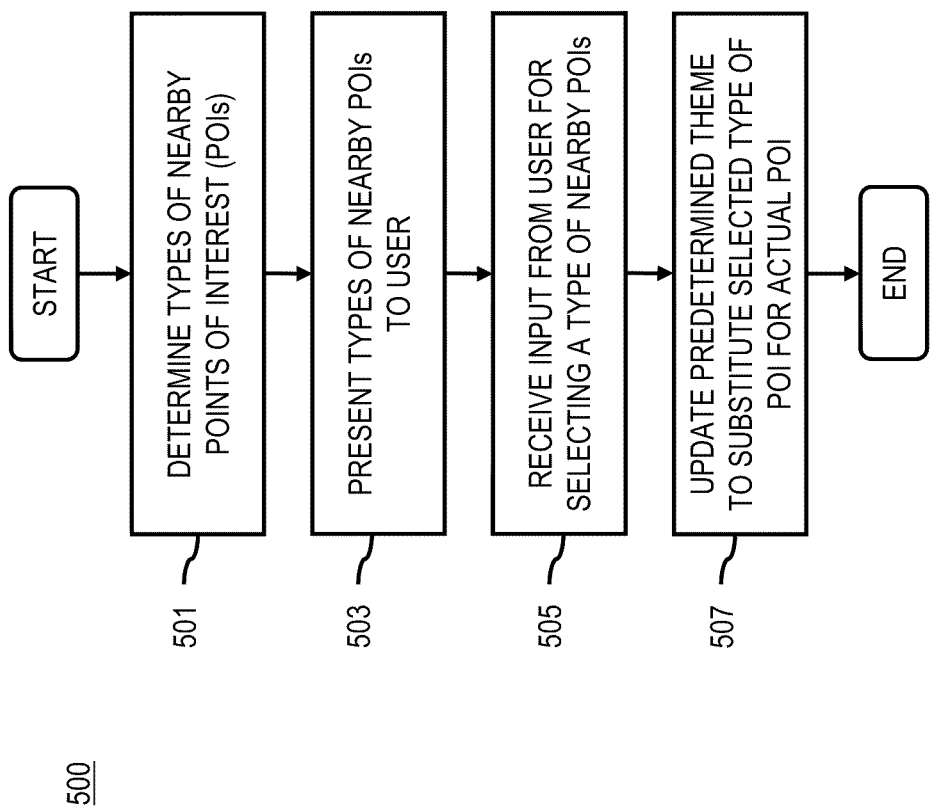
FIG. 5 is a flowchart of a process for updating a predetermined theme for modifying location and related information, according to one embodiment.
Figure 12:
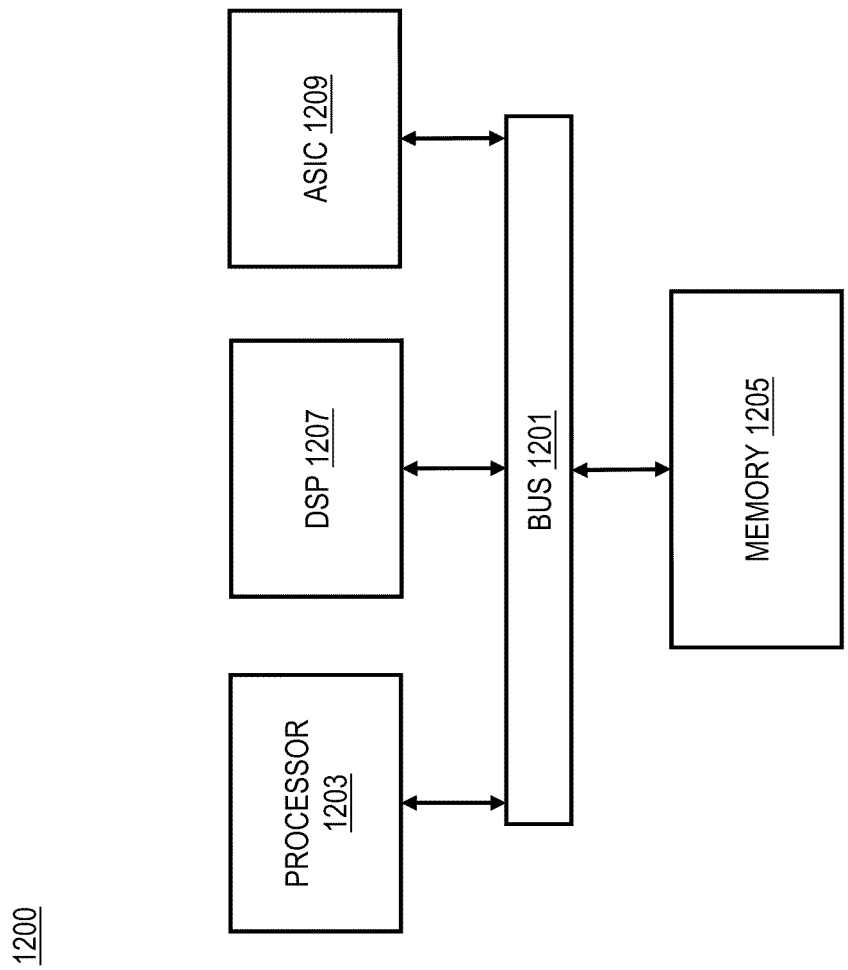
FIG. 12 is a diagram of a chip set that can be used to implement an embodiment of the invention.

FIG. 5 is a flowchart of a process for updating a predetermined theme for modifying location and related information, according to one embodiment. In one embodiment, the location modification platform 103 performs the process 500 and is implemented in, for instance, a chip set including a processor and a memory as shown in FIG. 12. In step 501, the location modification platform 103 determines the types of POIs within the vicinity of the UE 101a or a destination of the UE 101a. For example, the location modification platform can search the POI database of a mapping service (not shown) available over the communication network 107 to determine the POI types. In certain embodiments, the location modification platform 103 may include a POI database and the platform 103 need not search over the network 107. Determining the types of only those POIs near the UE 101a enables filtering of a potentially large number POI types from which the user can choose.

In step 503, the location modification platform 103 presents or causes actions that result in presenting the determined types of nearby POIs to the user via the UE 101a. The user may then select from among the presented POIs those POIs that should substitute for a type of actual POI that is visited by the user (step 505). For example, the location modification platform 103 may inform that there are POIs of the types "museum," "art gallery," and "store" nearby. The user may then select to substitute the "art gallery" POI type to substitute for any POIs of the type "pub" that the user visits. The location modification platform 103 then updates the predetermined theme to include the selected substitute POI. In this way, location modification platform 103 will apply the defined substitution when the predetermined theme is subsequently applied.

Figure 6:
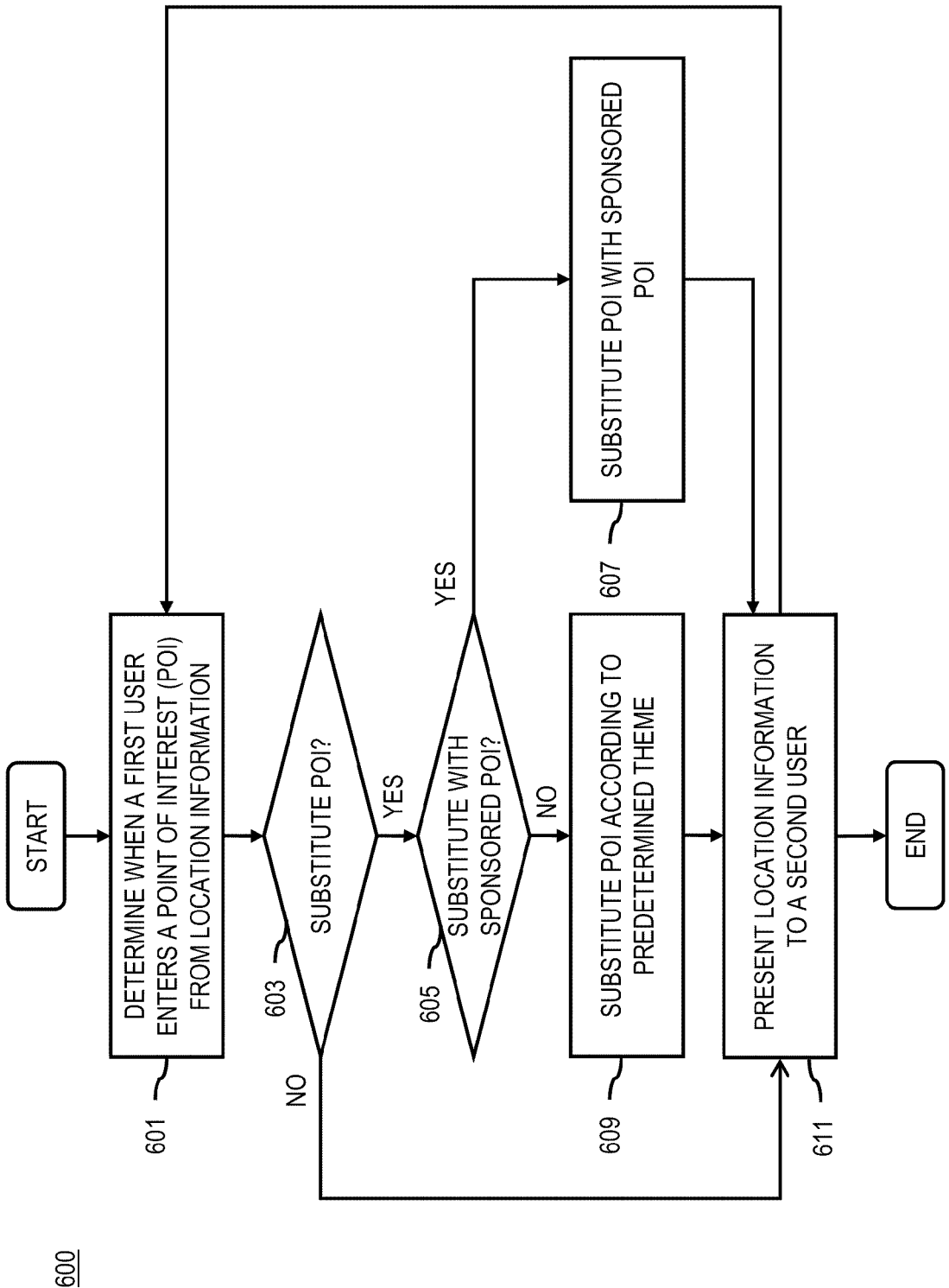
FIG. 6 is a flowchart of a process for thematically modifying location information by substituting points of interest, according to one embodiment.

FIG. 6 is a flowchart of a process for thematically modifying location information by substituting points of interest, according to one embodiment. In one embodiment, the location modification platform 103 performs the process 600 and is implemented in, for instance, a chip set including a processor and a memory as shown in FIG. 12. In step 601, the location modification platform 103 determines when the UE 101a associated with a first user enters a point of interest. By way of example, the location modification platform 103 makes this determination using the location information of the UE 101a (e.g., cellular triangulation, GPS, NFC hotspots, etc.). Next, the location modification platform 103 determines whether the visited POI is of a type is that is to be substituted according to the predetermined theme (step 603). For example, as described previously, the predetermined theme can include rules dictating how and when one POI should be substitute for another.

In certain embodiments, the location modification platform 103 is configured to substitute POIs based on marketing or advertising consideration. In this case, if the visited POI is of a type that should be substituted, the location modification platform 103 determines whether the substitution should be made with a sponsored POI designated for marketing or advertising (step 605). More specifically, the location modification platform 103, where appropriate, will attempt to the substitute the visited POI with the sponsored POI (step 607). For example, a sponsor typically pays the service provider or operator to ensure that the sponsored POI is substituted where possible to achieve the maximum possible exposure for the sponsored POI. Otherwise, the location modification platform substitutes the visited POI with the substitute POI according the predetermined theme as described in the process 400 of FIG. 4 (step 609). The modified POI or location information is then presented to a second user authorized to receive the information (step 611). The process can then return to step 601 to await determination of when the user enters another POI.

Figure 7:
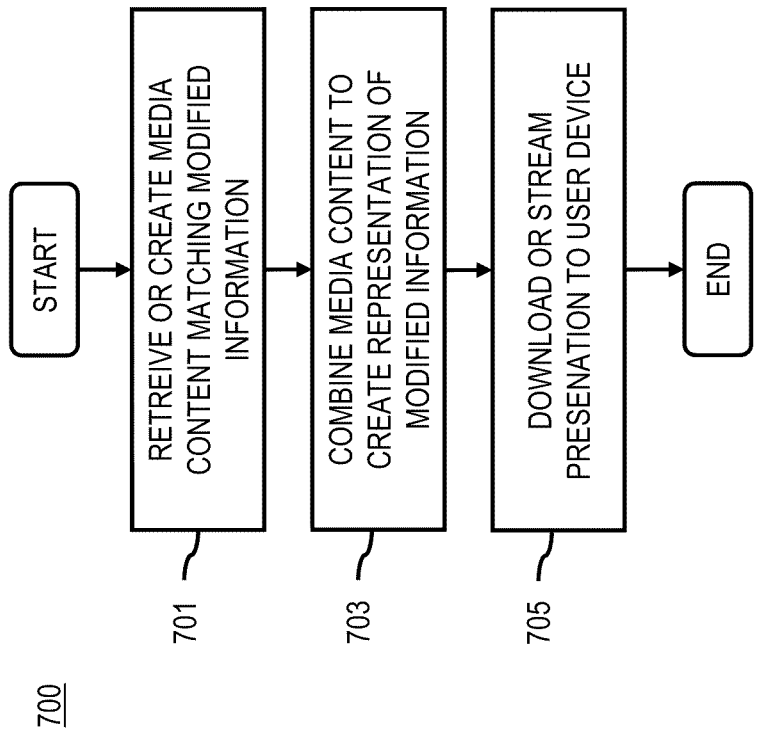
FIG. 7 is a flowchart of a process for generating a representation of thematically modified location and related information, according to one embodiment.

FIG. 7 is a flowchart of a process for generating a representation of thematically modified location and related information, according to one embodiment. In one embodiment, the location modification platform 103 performs the process 700 and is implemented in, for instance, a chip set including a processor and a memory as shown in FIG. 12. In addition or alternatively, the tracking service 105 and/or the tracking application 119 can perform the process 700. In step 701, the location modification platform 103 determines if media content (e.g., audio, video, pictures, maps, animation, three-dimensional models, etc.) is available in, for instance, the themes database 205, the location information database 109, temporal information database 111, and/or the event information database 113 to represent the modified location, temporal, and/or event information generated by the platform 103. In one embodiment, the location modification platform 103 makes this determination by comparing keywords associated with elements of the event information against, for instance, metadata associated the set of available media content. If no media content or insufficient media content is available, then the location modification platform 103 can create the media content matching the keywords.

Next, the location modification platform 103 combines the retrieved and/or created media content into a coherent audiovisual representation of the location information and associated temporal and event information (step 703). In one embodiment, a graphics rendering engine is used to create a computer animation depicting the user's movement and events based on the modified information. Moreover, the computer animation may vary in style from photorealistic to highly stylized (e.g., Japanese anime style). To construct the animation, the graphics rendering engine accesses models of the elements (e.g., people, vehicles, animals, tools/props, weather, cityscapes, etc.) associated with the modified information. By way of example, the representation of the modified information can be created locally on the UE 101*a* or online in the location modification platform 103 or the tracking service 105. If created online, the representation can be downloaded or streamed to the UE 101*a* (step 705).

It is also contemplated that the user can manually modify the representation of the modified information by, for instance, deleting elements of the information, changing the order of the elements, changing the timing of the elements, changing the content of the elements (e.g., replacing one keyword with another). In certain embodiments, the location modification platform 103 can modify the representation on the basis of guidance provided by the user (e.g., "make representation 50% shorter"). If the modified information and/or the corresponding representation includes sound recording, the location modification platform 103 can replace specific sounds with sounds according to the predetermined theme.

Alternatively, the representation can be a collage of text (e.g., subtitles), geo-tagged photographs and videos, thematically suitable move clips culled from a database, soundtrack with music and sound effects, narration, or a combination thereof. Additionally, it is contemplated that the representation may be created and transmitted either in real time or after a route is complete. For example, a user has activated a predetermined theme based on an action movie. As the user is driving to work, other users tracking his moving via the tracking service 105 may see in real time an animation of the user driving a high powered sports car with accompanying musical score as specified in the action movie theme.

In one embodiment, as described earlier, the audiovisual representation may be shared with one or more selected groups of users of the tracking service 105. Alternatively, the representation can be made publicly available. In addition, different user groups 117 (e.g., family, friends, club members) may be allowed to see different thematic representations of the same location and related information.

In yet another embodiment, the created representation may be presented on the UE 101 of a user when the user is calling another user. For example, if a first user calls a second user when the second user is in a restaurant with his or her grandmother, the first may see a picture of the second user having lunch with a movie star instead of the second user's grandmother.

Figure 8:
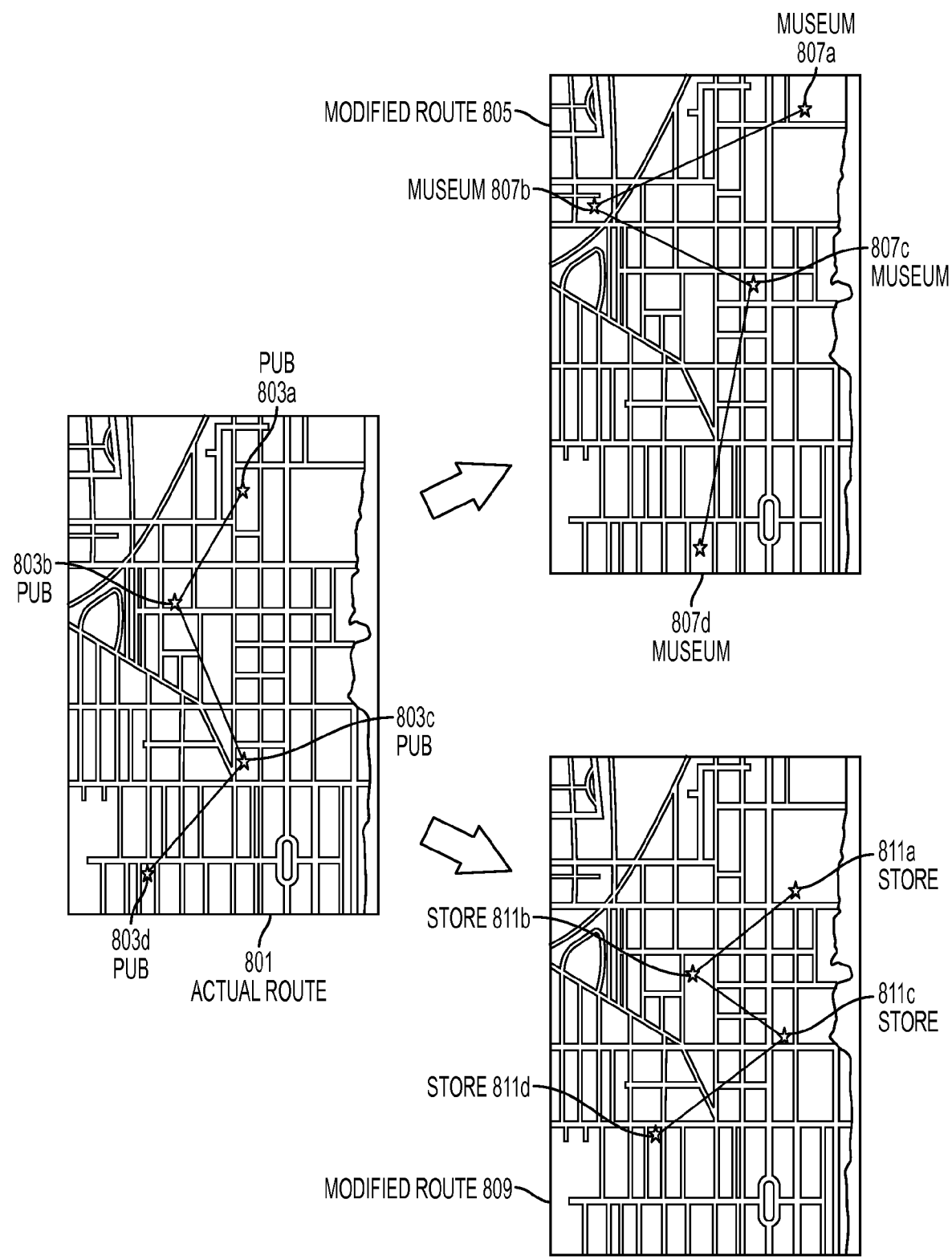
FIG. 8 is a diagram of maps presenting thematically modified location and related information, according to one embodiment.

FIG. 8 is a diagram of maps presenting thematically modified location and related information, according to one embodiment. As shown, a map 801 of a user's actual route depicts the user visiting four pubs (e.g., pubs 803*a*-803*d*). In the example of FIG. 8, the user has created two predetermined themes for application to two different user groups. For example, the map 805 of a modified route is based on a predetermined theme that substitutes visits to a pub with visits to a museum (e.g., museums 807*a*-807*d*). In applying the theme, the location modification platform 103 selects substitute POIs (e.g., museum 807*a*-807*d*) that are closest to the respective actual POIs. For example, when comparing the map 805 of a modified route to the map 801 of the actual route, the general routing is retained (although somewhat distorted due to the location of the substitute POIs).

Also shown is a map 809 that has been modified according to another predetermined theme that substitutes visits to a pub for visits to a store (e.g., stores 811*a*-811*d*). Again, the modification or offset of the actual route results in a modified route that approximates the shape and scale of the actual route. Each of the two maps 805 and 809 of a modified route may be presented separately to different groups of viewers authorized to receive the modified location and related information from the UE 101*a*.

Figure 9:
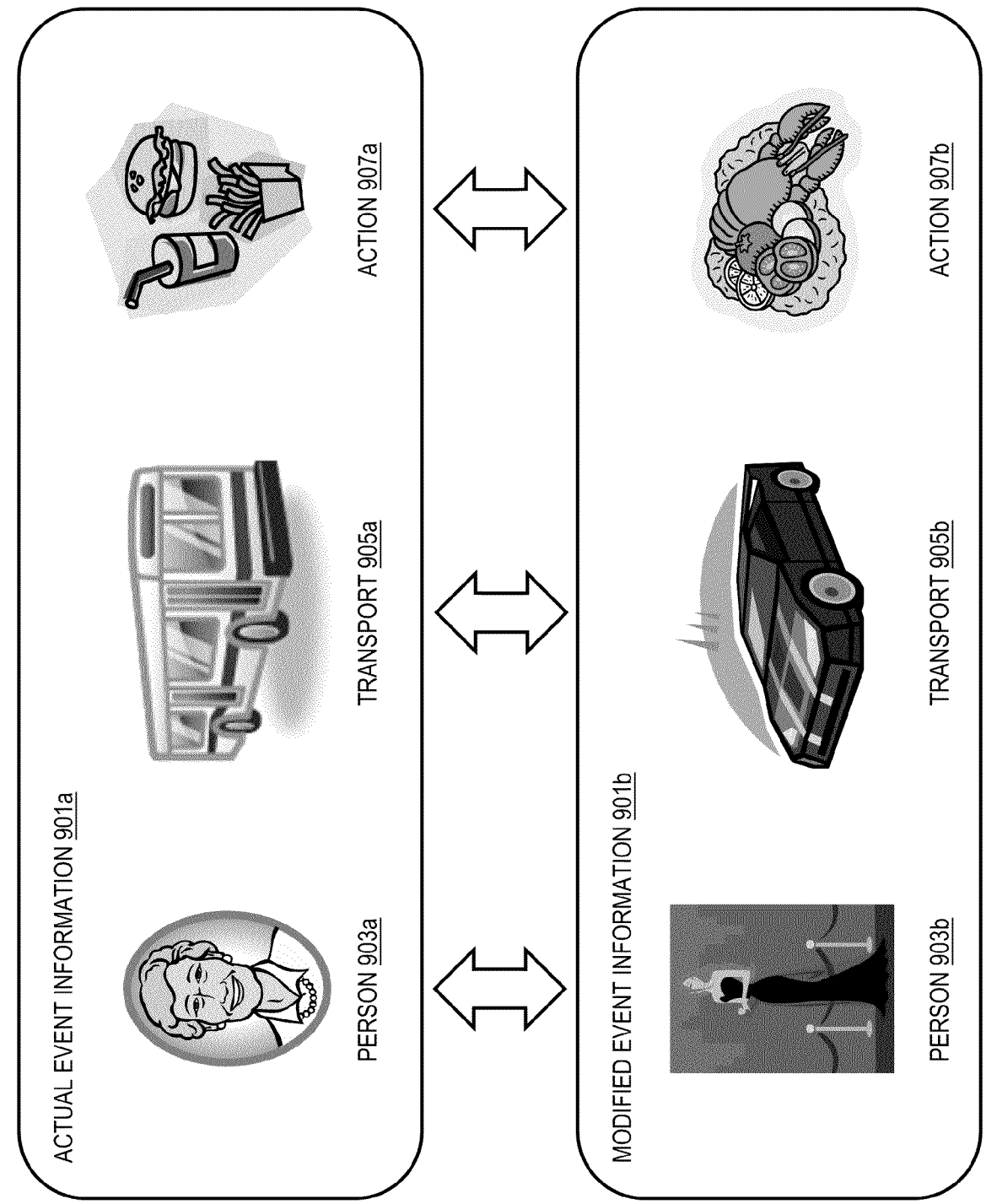
FIG. 9 is a diagram of thematic modifications to event information, according to one embodiment.

FIG. 9 is a diagram of thematic modifications to event information, according to one embodiment. More specifically, FIG. 9 depicts actual event information 901*a* that includes a person element 903*a*, transport element 905*a*, and action element 907*a*. The person element 903*a* contains information related to a person involved or associated with the actual event information 901*a*. As shown, the person element 903*a* corresponds to the user's grandmother. The transport element 905*a* contains information related to the means of transportation used as part of the actual event. As shown, the transport element 905*a* identifies use of a bus as the means of transportation. Finally, the action element 907*a* contains information on what activity is conducted as part of the actual event. As shown, the action element 907*a* describes the activity as eating fast food. Taken in total, the actuation event information 901*a* indicates that the user accompanied his or her grandmother on a bus to eat fast food.

In this example, the user has employed a predetermined theme to modify the actual event information 901*a* into a modified event information 901*b* based on a movie star's lifestyle. As applied, the predetermined movie star theme modified the person element 903*a* to a person element 903*b* corresponding to a glamorous actress, the transport element 905*a* to a transport element 903*b* corresponding to a sports car, and the action element 907*a* to an action element 907*b* corresponding to dining on lobster. Accordingly, the event information 901*b* modified according to the theme now indicates that the user traveled in a sports car with a glamorous actress to dine on lobster.

Figure 10:
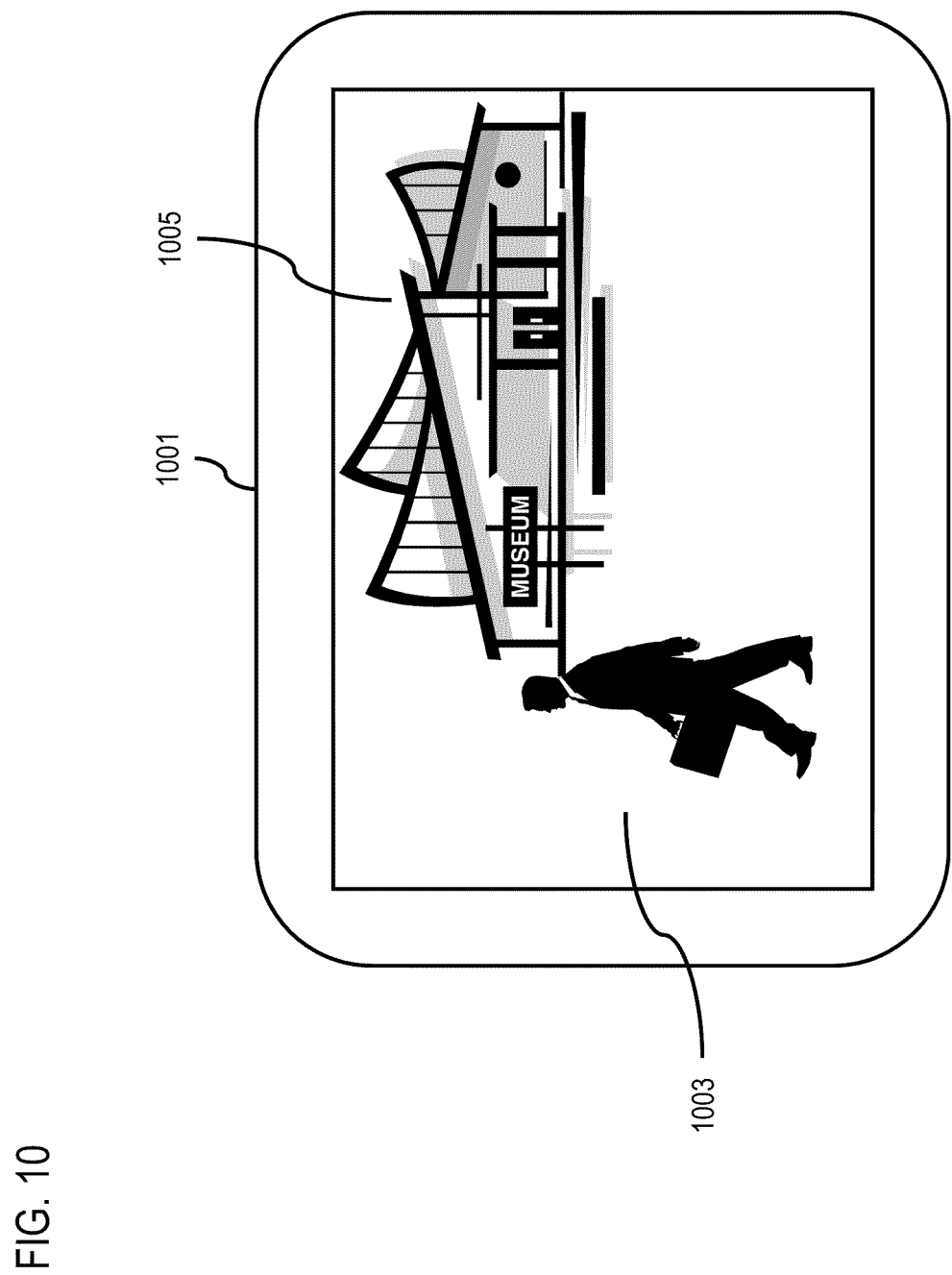
FIG. 10 is a diagram of a computer animation representing modified location and related information, according to one embodiment.

FIG. 10 is a diagram of a computer animation representing modified location and related information, according to one embodiment. As shown, the display screen 1001 corresponds to a UE 101 of a first user viewing modified location information shared by a second user. More specifically, the screen 1001 depicts an computer animation of the second user's modified location and related information. The second user 1003 is depicted as a three-dimensional model traveling through a three-dimensional space corresponding to the second user's modified information. In this example, the second user 1003 is shown leaving a museum 1005 when in actuality the second user 1003 just left a pub.

The processes described herein for thematically modifying or offsetting location and related information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

The processes described herein for thematically modifying location and related information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to thematically modify location and related information as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of thematically modifying location and related information.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to thematically modify location and related information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for thematically modifying location and related information. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for thematically modifying location and related information, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for thematically modifying location and related information determined from to the UE 101.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set 1200 upon which an embodiment of the invention may be implemented. Chip set 1200 is programmed to thematically modify location and related information as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of thematically modifying location and related information.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to thematically modify location and related information. The memory 1205 also stores the data associated with or generated by the execution of the inventive steps.

Figure 13:
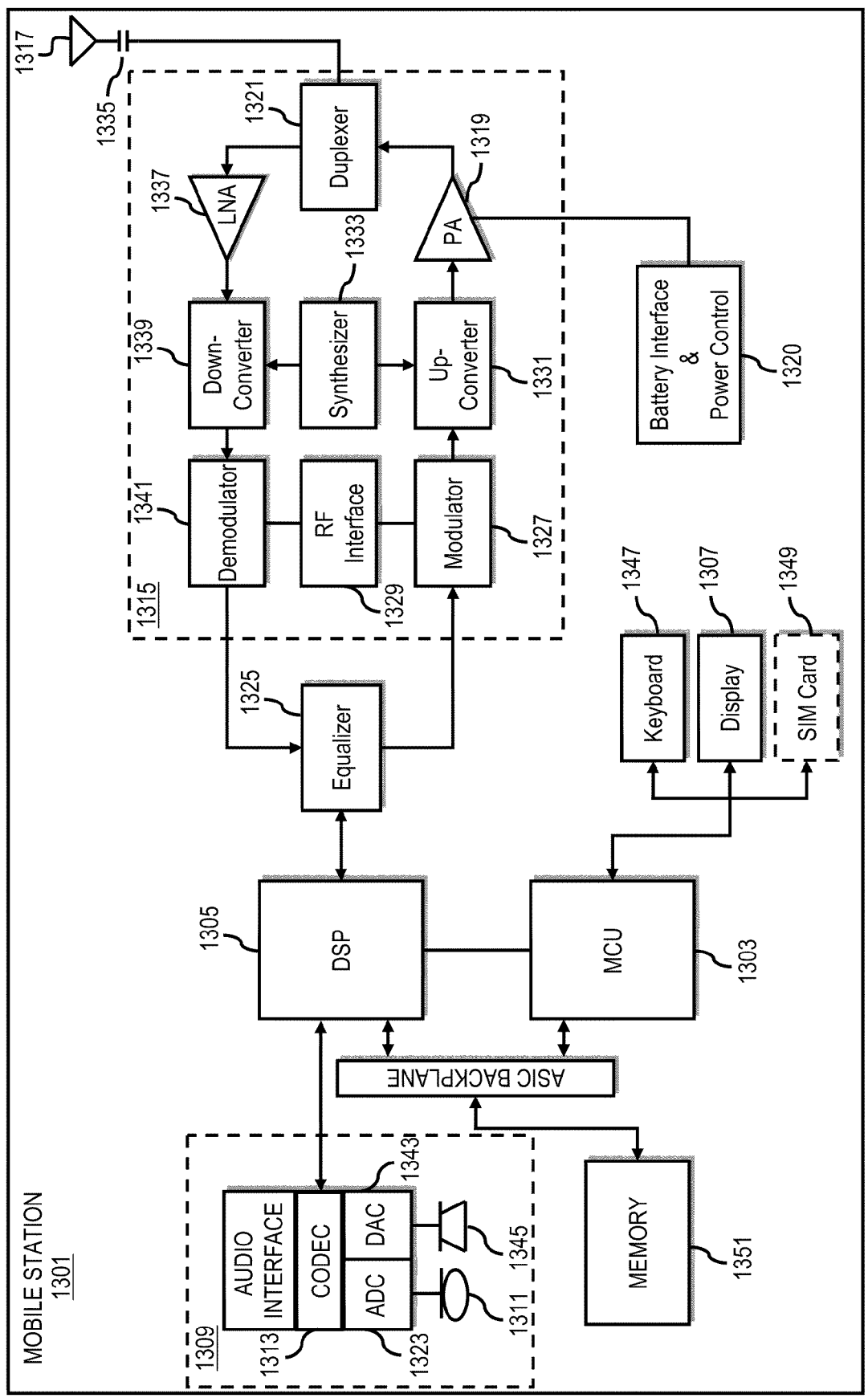
FIG. 13 is a diagram of a mobile terminal (e.g., a handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of thematically modifying location and related information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of thematically modifying location and related information. The display 13 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to thematically modify location and related information. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining location information of a device associated with a first user;
   modifying the location information to indicate a location other than an actual location of the device according to a predetermined theme other than or in addition to offsetting geographical coordinates; and
   causing, at least in part, actions that result in presentation of the modified location information to a second user.

2. A method of claim 1, further comprising:
   determining temporal information corresponding to the location information;
   scaling the temporal information according to the predetermined theme; and
   causing, at least in part, actions that result in presentation of the scaled temporal information to the second user,
   wherein the temporal information is determined from the location information, by input from the first user, or a combination thereof.

3. A method of claim 2, further comprising:
   receiving event information corresponding to the location information;
   modifying the event information to indicate an event other than an actual event corresponding to the location information; and
   causing, at least in part, actions that result in presentation of the offset event information to the second user.

4. A method of claim 3, wherein the event information includes information identifying people, locations, actions, tools, means of transport, weather, event outcomes, or a combination thereof, and wherein the event information is obtained from sensors of the device, by input from the first user, or a combination thereof.

5. A method of claim 3, wherein the presentation of the modified location information, the scaled temporal information, the modified event information, or a combination thereof is rendered in a computer animation.

6. A method of claim 3, further comprising:
   determining one or more types of points of interest within proximity of the device based on the location information;
   causing, at least in part, actions that result in presentation of the one or more types of points of interest to the first user; and
   receiving an input from the first user specifying at least one of the one or more types of points of interest to substitute for a type of point of interest corresponding to the actual location of the device,
   wherein the predetermined theme modifies the location information, scales the temporary information, modifies the event information, or performs a combination thereof based on the input.

7. A method of claim 3, further comprising:
   creating one or more user groups, wherein each user group is associated with a different predetermined theme;
   determining a user group to which the second user belongs from among the one or more created user groups; and
   determining the predetermined theme corresponding to the determined user group.

8. A method of claim 1, further comprising:
   causing, at least in part, actions that result in transmission of one or more media files associated with the predetermined theme to the device,
   wherein the predetermined theme is based, at least in part, on a thematic template.

9. An apparatus comprising:
   at least one processor; and
   at least one memory including computer program code,
   the at least one memory and the computer program code configured to, with the at least one processor, cause the apparatus to perform at least the following,
      determine location information of a device associated with a first user,
      modify the location information to indicate a location other than an actual location of the device according to a predetermined theme other than or in addition to offsetting geographical coordinates, and
      cause, at least in part, actions that result in presentation of the modified location information to a second user.

10. An apparatus of claim 9, wherein the apparatus is further caused to:
   determine temporal information corresponding to the location information;
   scale the temporal information according to the predetermined theme; and
   cause, at least in part, actions that result in presentation of the scaled temporal information to the second user,
   wherein the temporal information is determined from the location information, by input from the first user, or a combination thereof.

11. An apparatus of claim 10, wherein the apparatus is further caused to:
   receive event information corresponding to the location information;
   modify the event information to indicate an event other than an actual event corresponding to the location information; and
   cause, at least in part, actions that result in presentation of the modified event information to the second user.

12. An apparatus of claim 11, wherein the event information includes information identifying people, locations, actions, tools, means of transport, or a combination thereof, and wherein the event information is obtained from sensors of the device, by input from the first user, or a combination thereof.

13. An apparatus of claim 11, wherein the presentation of the modified location information, the scaled temporal information, the modified event information, or a combination thereof is rendered in a computer animation.

14. An apparatus of claim 9, wherein the apparatus is further caused to:
   determine one or more types of points of interest within proximity of the device based on the location information;
   cause, at least in part, actions that result in presentation of the one or more types of points of interest to the first user; and
   receive an input from the first user specifying at least one of the one or more types of points of interest to substitute for a type of point of interest corresponding to the actual location of the device,
   wherein the predetermined theme modifies the location information, scales the temporary information, modifies the event information, or performs a combination thereof based on the input.

15. An apparatus of claim 9, wherein the apparatus is further caused to:
   create one or more user groups, wherein each user group is associated with a different predetermined theme;
   determine a user group to which the second user belongs from among the one or more created user groups; and
   determine the predetermined theme corresponding to the determined user group.

16. An apparatus of claim 9, wherein the apparatus is further caused to:
   cause, at least in part, actions that result in transmission of one or more media files associated with the predetermined theme to the device,
   wherein the predetermined theme is based, at least in part, on a thematic template.

17. An apparatus of claim 9, wherein the apparatus is a mobile phone further comprising:
   user interface circuitry and user interface software configured to facilitate user control of at least some functions of the mobile phone through use of a display and configured to respond to user input; and
   a display and display circuitry configured to display at least a portion of a user interface of the mobile phone, the display and display circuitry configured to facilitate user control of at least some functions of the mobile phone.

18. A computer-readable storage medium carrying one or more sequences of one or more instructions which, when executed by one or more processors, cause an apparatus to at least perform the following steps:
   determining location information of a device associated with a first user;
   determining temporal information corresponding to the location information;
   modifying the location information to indicate a location other than an actual location of the device according to a predetermined theme other than or in addition to offsetting geographical coordinates;
   scaling the temporal information according to the predetermined theme; and
   causing, at least in part, actions that result in presentation of the modified location information and the scaled temporal information to a second user.

19. A computer readable storage medium of claim 18, wherein the apparatus is caused to further perform:
   receiving event information corresponding to the location information;
   modifying the event information to indicate an event other than an actual event corresponding to the location information; and
   causing, at least in part, actions that result in presentation of the modified event information to the second user,
   wherein the event information includes information identifying people, locations, actions, tools, means of transport, or a combination thereof, and wherein the event information is obtained from sensors of the device, by input from the first user, or a combination thereof.

20. A computer readable storage medium of claim 19, wherein the presentation of the modified location information, the scaled temporal information, the modified event information, or a combination thereof is rendered in a computer animation.

* * * * *